March 4, 1947.  T. H. WHALEY  2,416,724
FRACTIONATION APPARATUS
Filed Oct. 9, 1944
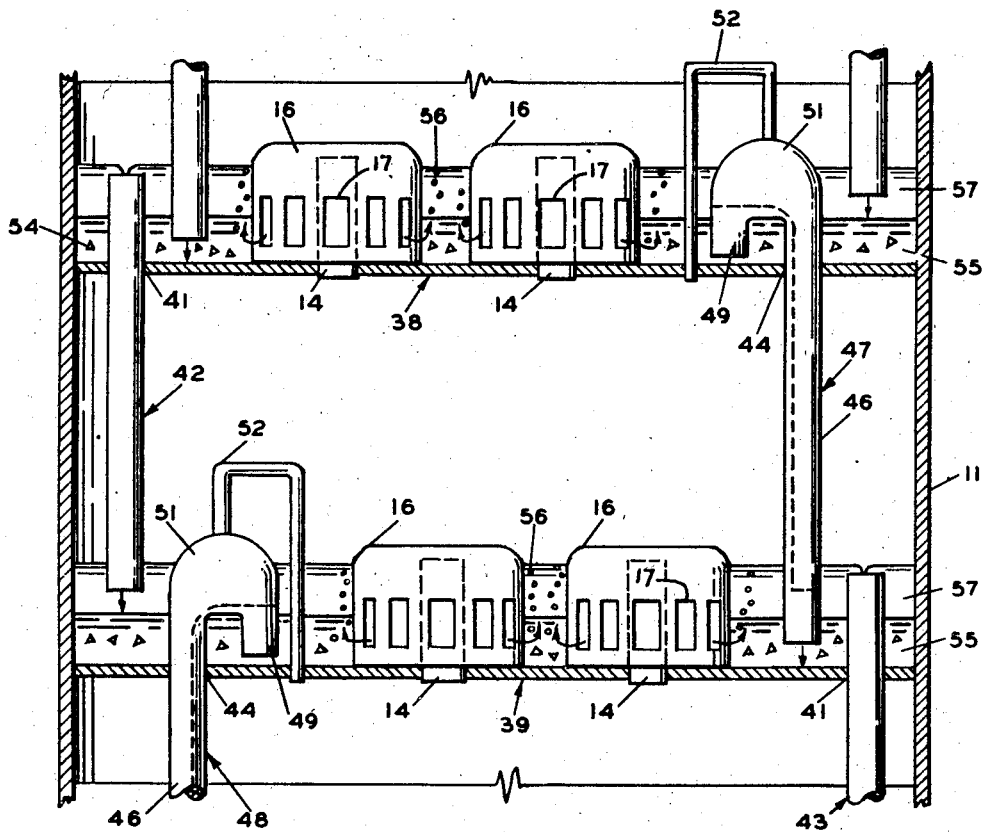
INVENTOR
T. H. WHALEY
BY Hudson & Young
ATTORNEYS Patented Mar. 4, 1947

2,416,724

UNITED STATES PATENT OFFICE 2,416,724

FRACTIONATION APPARATUS

Thomas H. Whaley, Bartlesville, Okla., assignor to Phillips Petroleum Company, a corporation of Delaware Application October 9, 1944, Serial No. 557,911

7 Claims. (Cl. 261—114)

This invention relates to bubble plate columns. In one of its more specific aspects it relates to improved downtakes, or apparatus for transferring liquid from a higher level to a lower level in a bubble tower. In a more specific aspect it relates to such downtakes in which control is important and especially to such downtakes which have to handle granular solids in the liquid, or have to handle a plurality of liquids, or have to handle both.

In the conventional bubble-cap type fractionation or absorption column a cylindrical tower is divided into compartments by a series of trays spaced one above the other along the length of the cylinder. Each plate is provided with bubble caps by reason of which vapor from the compartment below the plate is made to bubble through liquid on the plate and hence brought into intimate contact with the liquid. Each plate is provided with a weir or overflow for the liquid and with downpipes or downtakes which conduct the overflow liquid to the plate below. The vapor passing up the tower is brought into intimate contact at each plate with liquid which flows from plate to plate down the tower.

In the separation and purification of polymerizable organic monomers, for example butadiene, solid and semisolid materials formed by oxidation, polymerization, or both have caused serious operating difficulties. As a specific example, often in the fractionation of butadiene, the fractionating column has been so obstructed by accumulation of a granular white solid that the system had to be shut down and the equipment cleaned out. While it is most desirable to prevent the formation of these troublesome compounds, their occurrence may be expected even when inhibitors are used to prevent their formation. The present invention provides a bubble tower which will successfully handle granular, flocculent, or other non-adhesive solid substances capable of forming a slurry having fluid characteristics.

In some instances it is desirable to contact a plurality of liquid phases with a vapor or gaseous phase. For example, in the steam distillation of furfural in the butadiene absorption process for removal of dimers or liquid polymers, a water phase and a furfural and/or polymer phase may be present. This mixture cannot ordinarily be handled in a bubble plate column since the heavier phase, furfural, will stand on the plate to the overflow level and the lighter liquid phase will be spread in a thin layer on top of the heavier phase or dispersed as globules through the heavier phase. In either condition efficient intimate countercurrent contact between vapor and the lighter liquid is not accomplished. The present invention provides a bubble plate column which will successfully handle two liquid phases.

An object of this invention is to provide an improved bubble plate column for countercurrent contact of vapors and liquids.

Another object is to provide improved downtakes for bubble plate columns.

Still another object is to provide an improved bubble plate column which will handle non-adhesive solids.

A further object is to provide a bubble plate column which will handle a plurality of liquid phases.

A still further object is to provide a bubble plate column which will handle both non-adhesive solids and a plurality of liquid phases.

A still further object is to provide a bubble plate column in which the relative amounts of two or more liquid phases on the bubble plate may be controlled.

Other objects and advantages will be apparent to those skilled in the art from the following detailed description of the invention and from the accompanying drawing.

In the drawing is shown an elevational cross sectional view through a portion of a bubble tower embodying the present invention showing two trays, the upper and lower portions of said tower being broken away to avoid repetition of similar parts.

In the drawing a bubble tower or column is shown comprising a vertical shell 11, which for purposes of strength in hoop tension is preferably made cylindrical, but which, of course, may be of any desired cross section. Vertically spaced inside shell 11 is a series of substantially horizontally disposed bubble trays 38, 39 and others above and below (not shown). While trays 38 and 39 are identical they are given different numbers to make the discussion of them herein less confusing. Obviously the bottom and top trays, or end plates (not shown), of the column are modified and may consist merely of flat plates extending entirely across shell 11, through which, or adjacent to which, entrance and exit pipes may extend into connection with the spaces in tower 11 in the usual manner. As the top and bottom plates are conventional they are not illustrated in the drawings in order to direct the disclosure to the invention.

Plates or trays 38 and 39 are provided with a series of perforations 14 for the usual bubble caps 16 common in the prior art of bubble columns. Many other types of bubble caps such as caps 23, 30 of Figure 3 of the U. S. patent to Parsons 2,105,501 of January 18, 1938 may be employed in place of bubble caps 16 shown in the present application. The operation of such bubble caps being so well known, no further explanation seems necessary.

In trays 38 and 39 are also perforations 41 in which downtake pipes 42 are inserted and secured by any usual manner known to the prior art, such as welding. Trays 38 and 39 are also provided with perforations 44 in which the long legs 46 of inverted J tubes generally designated as 47 and 48 respectively are inserted and secured. Each of J tubes 47 and 48 is provided with a short leg 49 and a bend portion 51. The lower end of the long leg 46 preferably extends adjacent the upper surface of the next lower bubble tray while the lower end of the short leg 49 preferably extends adjacent on top of the same tray to which the J tube is secured. The bubble caps 16 have slots 17 from which the gas emerges as bubbles 56.

Extending from the bend portion 51 to the vapor space above the next lower tray is a conduit 52. Conduit 52 provides communication between the vapor space in the J tube and in between the trays so that syphoning is prevented.

While the top of J tube 47 is shown as a U bend 51 and 49, obvious mechanical equivalents may be substituted having the same hydraulic properties.

Operation

The operation of the tower shown in the drawing is as follows:

When two immiscible liquids 55 and 57 are traveling down the tower 11 and vapors are traveling up said tower, liquid 55 being the heavier liquid obviously remains below liquid 57, liquid 57 being forced upwardly by liquid 55. Non-adhesive granular particles 54 are shown carried only by liquid 55 but they may be carried by either or both of liquids 55 and 57 without substantially changing the operation.

In the drawings vapor is passing upwardly through the tower by passing through bubble caps 16, and liquids 55 and 57 are proceeding downward through tower 11 as will be explained below. Liquid 57 proceeds downwardly by overflowing into properly adjusted downtake pipe 42 and the upper end of downtake pipe 42 is secured at the proper elevation for this purpose. The lower end of downtake pipe 42 and of 43 may be disposed over a wide range. However to provide a liquid seal against upward passage of the vapor, it is desirable to have the lower end of downtake pipe 42 extend below the top of downtake pipe 43 continuing in like manner down the column.

The heavier liquid 55 is forced up into the short leg 49 of the J tubes 47 and 48 by the hydrostatic head of both liquids 55 and 57 and when heavy liquid 55 has accumulated to such a point that it may be forced over bend 51 the heavy liquid 55 passes down long leg 46 to the next lower tray. The lower end of leg 46 may be of any length and need not extend below the surface of the liquid on the tray below since vapors cannot pass from the vapor space of the tray below to the vapor space of the one above through J tube 47 as long as there is liquid in the short leg 49 of the J tube. The lower end of short leg 49 is preferably positioned adjacent the top of the tray so that the granular particles 54 which are agitated by vapor bubbles 56 will be swept by the high velocity created by the close spacing into leg 49 and passed over bend 51 down to the next tray through connection 46.

To prevent a syphoning action which would draw too much liquid off of tray 38 to tray 39 the bend 51 is provided with a conduit 52 leading to the vapor space between trays 38 and 39. Conduit 52 allows vapor to pass from bend 51 to the space below and vice versa so that no syphoning action can occur.

It is therefore evident that applicant has provided a device in which the following advantages are provided.

Granular, flocculent and other substantially non-adhesive solids may be handled in a plate type column. The agitation resulting from the bubbling of the vapor through the liquid on the plate prevents serious accumulation of the solids around the bubble caps. The continuous removal of solids by the improved downtake prevents concentration of solids on the plate to the point where it interferes with vapor or liquid throughput.

Two liquid phases may be handled and the relative volumes of each on the bubble plate controlled by the apparatus of this invention. In the present invention the improved downtake handles the heavy liquid and/or solids while the conventional downpipe handles the overflowing lighter liquid. The liquid level of the liquid of greater density is dependent upon the total liquid level since the weight of the column of heavy liquid inside the downcomer 47 is equal to the weight of the composite or two liquid layers outside the downcomer. The bottom draw downtake of my invention limits the interface level when two liquid phases are present. However it is believed obvious that a single liquid phase, or a single liquid phase containing solid particles may obviously be handled by the present invention.

Two liquid phases and a solid phase may be handled.

A solid or immiscible liquid catalyst, inhibitor, reactant, or the like may be used in the bubble plate column. The solid or heavy liquid is added to the top of the column. For example, in the distillation of butadiene a solid inhibitor such as a copper salt may be fed to the top of the column, passing downward from plate to plate with the liquid.

As previously pointed out downpipes and seal-pots or submergence of the downpipe on the plate below are not essential to the invention.

Foaming does not interfere with the operation of the improved downtake.

Vapor entrainment with the downcoming liquid, a serious limitation to the capacity of some downtakes, is eliminated or greatly decreased.

By using both the conventional downpipe and the improved downtake at opposite sides of the bubble plates, countercurrent flow of the two liquid phases across the plate may be effected.

Obviously the inverted J tube claimed may be replaced by obvious mechanical equivalents having the same hydraulic properties without departing from the spirit or scope of the invention as described and claimed.

Although only certain embodiments of my invention have been disclosed for purposes of illustration, it is to be understood that the invention is not thereby limited thereto, but only to be limited in accordance with the following claims when interpreted in view of the prior art.

Having described my invention I claim:

1. A bubble column for contact of vapors and liquids comprising in combination a vertical shell, vertically spaced substantially horizontal bubble trays extending across said shell, said trays having perforations therethrough, a bubble cap on each tray operatively connected to one of said perforations, an inverted J tube on each tray having its long leg extending through another of said perforations and sealed to said tray, the end of the short leg of said J being disposed adjacent the top of said tray, the end of the long leg of said J being disposed adjacent the top of the next lower tray, a conduit connecting the top of the bend of said J and the space below the tray to which said J is sealed and a downtake pipe extending through another of said perforations on each of said trays from a point above the intake of said short leg of the J on the same tray to a point below the intake of the downtake pipe on the next lower tray and sealed to said tray.

2. A bubble column for contact of vapors and liquids comprising in combination a vertical shell, vertically spaced substantially horizontal bubble trays extending across said shell, said trays having perforations therethrough, a bubble cap on each tray operatively connected to one of said perforations, an inverted J tube on each tray having its long leg extending through another of said perforations and sealed to said tray, the end of the long leg of said J being disposed adjacent the top of the next lower tray, a conduit connecting the top of the bend of said J and the space below the tray to which said J is sealed and a downtake pipe extending through another of said perforations on each of said trays from a point above the intake of said short leg of the J on the same tray to a point below the intake of the downtake pipe on the next lower tray and sealed to said tray.

3. A bubble column for contact of vapors and liquids comprising in combination a vertical shell, vertically spaced substantially horizontal bubble trays extending across said shell, said trays having perforations therethrough, a bubble cap on each tray operatively connected to one of said perforations, an inverted J tube on each tray having its long leg extending through another of said perforations and sealed to said tray, the end of the short leg of said J being disposed adjacent the top of said tray, a conduit connecting the top of the bend of said J and the space below the tray to which said J is sealed and a downtake pipe extending through another of said perforations on each of said trays from a point above the intake of said short leg of the J on the same tray to a point below the intake of the downtake pipe on the next lower tray and sealed to said tray.

4. A bubble column for contact of vapors and liquids comprising in combination a vertical shell, vertically spaced substantially horizontal bubble trays extending across said shell, said trays having perforations therethrough, a bubble cap on each tray operatively connected to one of said perforations, an inverted J tube on each tray having its long leg extending through another of said perforations and sealed to said tray, the end of the short leg of said J being disposed adjacent the top of said tray, the end of the long leg of said J being disposed adjacent the top of the next lower tray, a conduit connecting the top of the bend of said J and the space below the tray to which said J is sealed and a downtake pipe extending through another of said perforations on each of said trays.

5. A bubble column for contact of vapors and liquids comprising in combination a vertical shell, vertically spaced substantially horizontal bubble trays extending across said shell, said trays having perforations therethrough, a bubble cap on each tray operatively connected to one of said perforations, an inverted J tube on each tray having its long leg extending through another of said perforations and sealed to said tray, a conduit connecting the top of the bend of said J and the space below the tray to which said J is sealed, and a downtake pipe extending through another of said perforations on each of said trays.

6. A bubble column for contact of vapors and liquids comprising in combination a vertical shell, vertically spaced substantially horizontal bubble trays extending across said shell, said trays having perforations therethrough, a bubble cap on each tray operatively connected to one of said perforations, an inverted J tube on each tray having its long leg extending through another of said perforations and sealed to said tray, a conduit connecting the top of the bend of said J and the space below the tray to which said J is sealed, and a downtake pipe extending through another of said perforations on each of said trays from a point above the intake of said short leg of the J on the same tray to a point below the intake of the downtake pipe on the next lower tray and sealed to said tray.

7. A bubble column for contact of vapors and liquids comprising in combination a vertical shell, vertically spaced substantially horizontal bubble trays extending across said shell, said trays having perforations therethrough, a bubble cap on each tray operatively connected to one of said perforations, an inverted J tube on each tray having its long leg extending through another of said perforations and sealed to said tray, and a conduit connecting the top of the bend of said J and the space below the tray to which said J is sealed.

THOMAS H. WHALEY.

REFERENCES CITED

The following references are of record in the file of this patent:

UNITED STATES PATENTS

| Number | Name | Date |
| --- | --- | --- |
| 1,741,519 | Huff | Dec. 31, 1929 |
| 1,862,758 | Merley | June 14, 1932 |
| 897,125 | McCabe et al. | Aug. 25, 1908 |
| 1,995,065 | Hetzer | Mar. 19, 1935 |
| 37,731 | Bristol | Feb. 24, 1863 |
| 2,205,336 | Beach | June 18, 1940 |

FOREIGN PATENTS

| Number | Country | Date |
| --- | --- | --- |
| 211,542 | British | Feb. 28, 1924 |
| 4,324 | British | Mar. 19, 1890 |
| 619,168 | French | Mar. 28, 1927 |